US008954640B1

(12) United States Patent
Tam (10) Patent No.: US 8,954,640 B1
(45) Date of Patent: Feb. 10, 2015

(54) IN-SYSTEM PROGRAMMING OF MEMORY EXTERNAL TO INTEGRATED CIRCUIT

(75) Inventor: Simon Tam, Fremont, CA (US)

(73) Assignee: Xilinx, Inc., San Jose, CA (US)

( * ) Notice: Subject to any disclaimer, the term of this patent is extended or adjusted under 35 U.S.C. 154(b) by 199 days.

(21) Appl. No.: 13/370,273

(22) Filed: Feb. 9, 2012

(51) Int. Cl.
*G06F 3/00* (2006.01)
*G06F 13/00* (2006.01)

(52) U.S. Cl.
USPC .............................................. 710/104; 710/8

(58) Field of Classification Search
None
See application file for complete search history.

(56) References Cited

U.S. PATENT DOCUMENTS

| | | | | |
|---|---|---|---|---|
| 6,035,346 | A * | 3/2000 | Chieng et al. | 710/10 |
| 7,253,387 | B2 * | 8/2007 | Archer et al. | 250/207 |
| 7,397,274 | B1 * | 7/2008 | Tang et al. | 326/40 |
| 2007/0113023 | A1 * | 5/2007 | Arulambalam et al. | 711/147 |
| 2008/0307109 | A1 * | 12/2008 | Galloway et al. | 709/232 |

OTHER PUBLICATIONS

Universal Serial Bus Specification revision 2.0, Apr. 27, 2000.*
Chapman, Ken, Spartan-3E, PicoBlaze, SPI Flash Programmer for Spartan-3E Starter Kit, Rev. 1, RS232, SPI Flash ISE 7.1i, Nov. 2004, pp. 1-21, Xilinx, Inc.2100 Logic Drive, San Jose, CA USA.
Chapman, Ken, Spartan-3E, PicoBlaze, NOR Flash Programmer for Spartan-3E Starter Kit, Rev. 1, RS232, NOR Flash ISE 8.1i, Mar. 2006, pp. 1-27, Xilinx, Inc.2100 Logic Drive, San Jose, CA USA.
Xilinx, Inc., JDrive: In-System Programming of IEEE Standard 1532 Devices, XAPP500 (v2.1.2), Nov. 12, 2007, pp. 1-10, Xilinx, Inc. 2100 Logic Drive, San Jose, CA USA.
Xilinx, Inc., "Low-Profile In-System Programming Using XCF32P Platform Flash PROMs" XAPP975 (v1.0.3), May 12, 2008, pp. 1-9, Xilinx, Inc.2100 Logic Drive, San Jose, CA USA.
Xilinx, Inc., "Xilinx In-System Programming Using an Embedded Microcontroller", XAPP058 (v4.1), Mar. 6, 2009, pp. 1-23, Xilinx, Inc.2100 Logic Drive, San Jose, CA USA.
Xilinx, Inc., "Indirect Programming of SPI Serial Flash PROMs with Spartan-3A FPGAs" XAPP974 (v1.1.3), Mar. 24, 2009, pp. 1-18, Xilinx, Inc.2100 Logic Drive, San Jose, CA USA.
Xilinx, Inc., "Indirect Programming of BPI PROMs with Virtex-5 FPGAs" XAPP973 (v1.4), Mar. 8, 2010, pp. 1-28, Xilinx, Inc.2100 Logic Drive, San Jose, CA USA.
Xilinx, Inc., "ChipScope Pro Software and Cores", UG029 (v13.4), Jan. 18, 2012, pp. 1-216, Xilinx, Inc.2100 Logic Drive, San Jose, CA USA.
Xilinx, Inc., iMPACT Introduction to Indirect Programming—SPI or BPI Flash Memory, 2005, pp. 1-4, Xilinx, Inc., 2100 Logic Drive, San Jose, CA USA http://www.xilinx.com/support/documentation/sw_manuals/xilinx13_4/pim_c_introduction_indirect_programming.htm.

(Continued)

*Primary Examiner* — Idriss N Alrobaye
*Assistant Examiner* — Ronald Modo
(74) *Attorney, Agent, or Firm* — Kevin T. Cuenot (57) ABSTRACT

An integrated circuit (IC) can include an interface configured to receive packetized data specifying a programming instruction for a memory external to the integrated circuit over a first communication channel. The first communication channel can be an in-band signaling channel also used by the IC when performing a function independent of programming the memory. The IC can include a buffer having a first port coupled to the interface and a second port. The buffer can be configured to store the programming instruction extracted from the packetized data. The IC also can include a programmer coupled to the second port. The programmer can be configured to program the memory over a second communication channel different from the first communication channel responsive to interpretation of the programming instruction from the buffer.

19 Claims, 5 Drawing Sheets

(56) References Cited

OTHER PUBLICATIONS

Xilinx, Inc., "iMPACT Overview", 2005, p. 1, Xilinx, Inc., 2100 Logic Drive, San Jose, CA USA http://www.xilinx.com/support/documentation/sw_manuals/xilinx13_4/pim_c_overview.htm.

Xilinx, Inc., iMPACT Configuring SPI or BPI Flash Devices through FPGA, 2005, p. 1, Xilinx, Inc., 2100 Logic Drive, San Jose, CA USA http://www.xilinx.com/itp/xilinx10/isehelp/pim_p_configuring_spi_or_bpi_through_fpga.htm.

Xilinx, Inc., iMPACT Programming an SPI or BPI Flash Memory through an FPGA, 2005, pp. 1-2, Xilinx, Inc., 2100 Logic Drive, San Jose, CA USA http://www.xilinx.com/support/documentation/sw_manuals/xilinx13_4/pim_p_configure_spi_or_bpi_through_fpga.htm.

Xilinx, Inc., Application Note, XAPP 518 (v1.0), Mar. 27, 2012, pp. 1-34, Xilinx, Inc., 2100 Logic Drive, San Jose, CA USA.

Xilinx, Inc., Application Note, XAPP 518 (v1.1), Aug. 28, 2012, pp. 1-37, Xilinx, Inc., 2100 Logic Drive, San Jose, CA USA.

* cited by examiner

IN-SYSTEM PROGRAMMING OF MEMORY EXTERNAL TO INTEGRATED CIRCUIT

FIELD OF THE INVENTION

One or more embodiments disclosed within this specification relate to integrated circuits (ICs). More particularly, one or more embodiments relate to in-system programming of a memory that is external to an IC.

BACKGROUND

Many electronic systems incorporate memories such as programmable read-only memories (PROMs) for various purposes including general system memory. Once the system is operational and deployed into the field, updating the contents of a PROM within the system can be difficult and time consuming. In many cases, a device is included within the system that can be used to program the PROM. Utilizing such a device, however, requires manual intervention. Typically, a technician is dispatched into the field to service the system. The technician manually accesses a port of the device, e.g., a Joint Test Action Group (JTAG) port, that is dedicated for testing, debugging, or updating. Through the JTAG port, the technician can provide data to the device, which in turn can program the PROM.

SUMMARY

One or more embodiments disclosed within this specification relate to integrated circuits (ICs) and, more particularly, to in-system programming of a memory that is external to an IC.

An embodiment can include an integrated circuit (IC). The IC can include an interface configured to receive packetized data specifying a programming instruction for a memory external to the IC over a first communication channel. The first communication channel can be an in-band signaling channel also used by the IC when performing a function independent of programming the memory. The IC can include a buffer having a first port coupled to the interface and a second port. The buffer can be configured to store the programming instruction extracted from the packetized data. The IC also can include a programmer coupled to the second port. The programmer can be configured to program the memory over a second communication channel different from the first communication channel responsive to interpretation of the programming instruction from the buffer.

Another embodiment can include a system. The system can include an IC configured to receive a programming instruction for programming a memory external to the IC over a first communication channel and program the memory, responsive to the programming instruction, over a second communication channel that is different from the first communication channel. The first communication channel can be an in-band signaling channel used by the IC when configured for performing a function independent of programming the memory.

Another embodiment can include a method. The method can include receiving, by an IC and over a first communication channel, a first packet associated with a first function of the IC that is independent of programming a memory external to the integrated circuit. A second packet associated with a second function of the IC can be received. The second function can include programming the memory coupled to the IC. The method also can include programming the memory from the IC responsive to the second packet over a second communication channel that is different from the first communication channel.

DETAILED DESCRIPTION OF THE DRAWINGS

While the specification concludes with claims defining features of one or more embodiments that are regarded as novel, it is believed that the one or more embodiments will be better understood from a consideration of the description in conjunction with the drawings. As required, one or more detailed embodiments are disclosed within this specification. It should be appreciated, however, that the one or more embodiments are merely exemplary. Therefore, specific structural and functional details disclosed within this specification are not to be interpreted as limiting, but merely as a basis for the claims and as a representative basis for teaching one skilled in the art to variously employ the one or more embodiments in virtually any appropriately detailed structure. Further, the terms and phrases used herein are not intended to be limiting, but rather to provide an understandable description of the one or more embodiments disclosed herein.

One or more embodiments disclosed within this specification relate to integrated circuits (ICs). More particularly, one or more embodiments relate to in-system programming of a memory that is external to an IC. An IC can be configured to communicate over a communication channel with one or more other devices including a host device while operational in a larger, electrical system. The IC further can be coupled to a memory, for example, a programmable read-only memory (PROM), that is available for use within the system by one or more components that may include the IC.

In one aspect, rather than utilizing an additional and separate communication channel such as a Joint Test Action Group (JTAG) port of the IC for purposes of programming the memory, the data necessary for programming the memory can be received by the IC over the same communication channel over which the IC communicates when operational in the field and performing functions other than programming the memory, e.g., via an in-band signaling channel. The IC can interpret the received data sent over the communication channel to program, e.g., field program, the PROM as instructed without the use of a side-band channel.

Figure 1:
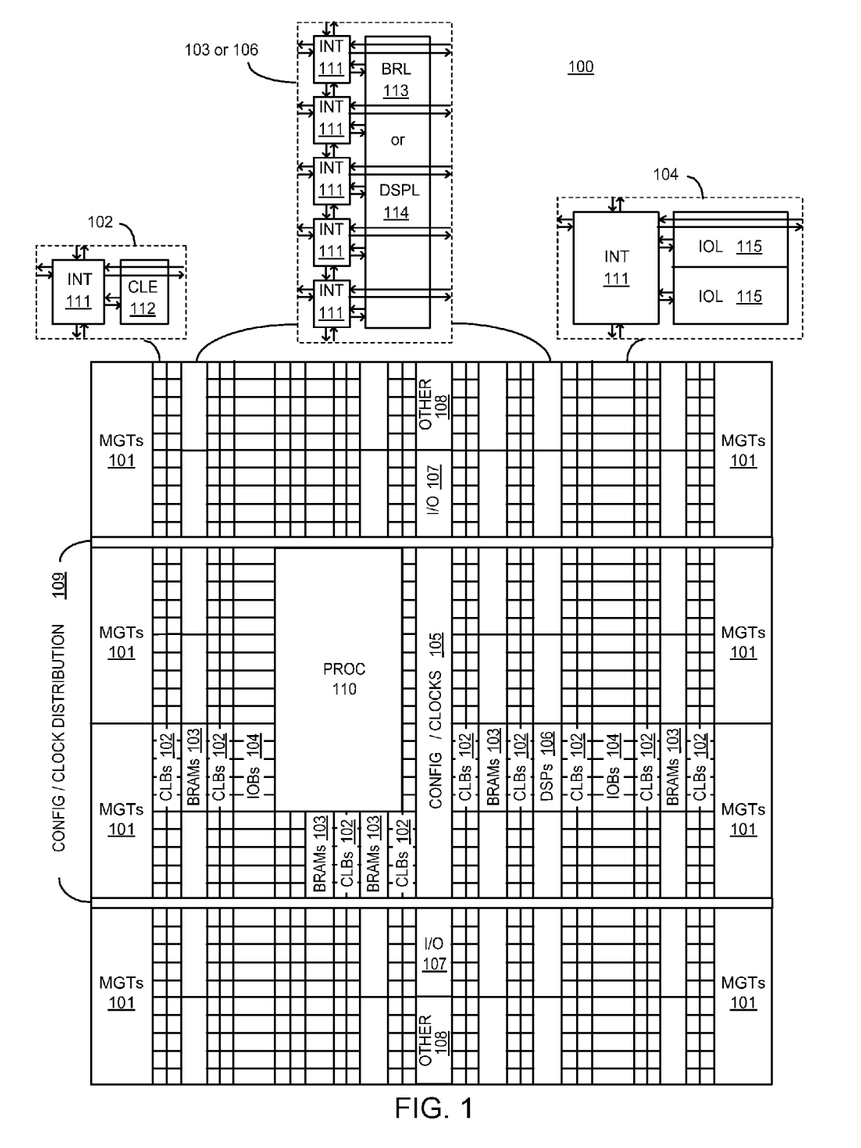
FIG. 1 is a block diagram illustrating an architecture for an integrated circuit in accordance with an embodiment disclosed within this specification.

FIG. 1 is a block diagram illustrating an architecture 100 for an IC in accordance with an embodiment disclosed within this specification. Architecture 100 can be implemented within a field programmable gate array (FPGA) type of IC, for example. As shown, architecture 100 includes several different types of programmable circuit, e.g., logic, blocks. For example, architecture 100 can include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized I/O blocks 107 (e.g., configuration ports and clock ports), and other programmable logic 108 such as digital clock managers, analog-to-digital converters, system monitoring logic, and so forth.

In some ICs, each programmable tile includes a programmable interconnect element (INT) 111 having standardized connections to and from a corresponding INT 111 in each adjacent tile. Therefore, the INTs 111, taken together, implement the programmable interconnect structure for the illustrated IC. Each INT 111 also includes the connections to and from the programmable logic element within the same tile, as shown by the examples included at the top of FIG. 1.

For example, a CLB 102 can include a configurable logic element (CLE) 112 that can be programmed to implement user logic plus a single INT 111. A BRAM 103 can include a BRAM logic element (BRL) 113 in addition to one or more INTs 111. Typically, the number of INTs 111 included in a tile depends on the height of the tile. In the pictured embodiment, a BRAM tile has the same height as five CLBs, but other numbers (e.g., four) can also be used. A DSP tile 106 can include a DSP logic element (DSPL) 114 in addition to an appropriate number of INTs 111. An IOB 104 can include, for example, two instances of an I/O logic element (IOL) 115 in addition to one instance of an INT 111. As will be clear to those of skill in the art, the actual I/O pads connected, for example, to IOL 115 typically are not confined to the area of IOL 115.

In the example pictured in FIG. 1, a columnar area near the center of the die, e.g., formed of regions 105, 107, and 108, can be used for configuration, clock, and other control logic. Horizontal areas 109 extending from this column are used to distribute the clocks and configuration signals across the breadth of the programmable IC.

Some ICs utilizing the architecture illustrated in FIG. 1 include additional logic blocks that disrupt the regular columnar structure making up a large part of the IC. The additional logic blocks can be programmable blocks and/or dedicated circuitry. For example, a processor block depicted as PROC 110 spans several columns of CLBs and BRAMs.

PROC 110 can be implemented as a hard-wired processor that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like. It should be appreciated, however, that the inclusion of a hard-wired processor such as PROC 110 can be excluded from architecture 100 and replaced with one or more of the other varieties of programmable blocks described. Further, such blocks can be utilized to form a "soft processor" in that the various blocks of programmable circuitry can be used to form a processor that can execute program code as is the case with hard-wired PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 103 and BRAMs 103 can be considered programmable circuitry of the IC.

In general, the functionality of programmable circuitry is not established until configuration data is loaded into the IC. A set of configuration bits can be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual IC, for example, more than one adjacent column of CLBs is typically included wherever the CLBs appear, to facilitate the efficient implementation of a user circuit design. The number of adjacent CLB columns, however, can vary with the overall size of the IC. Further, the size and/or positioning of blocks such as PROC 110 within the IC are for purposes of illustration only and are not intended as a limitation of the one or more embodiments disclosed within this specification.

Figure 2:
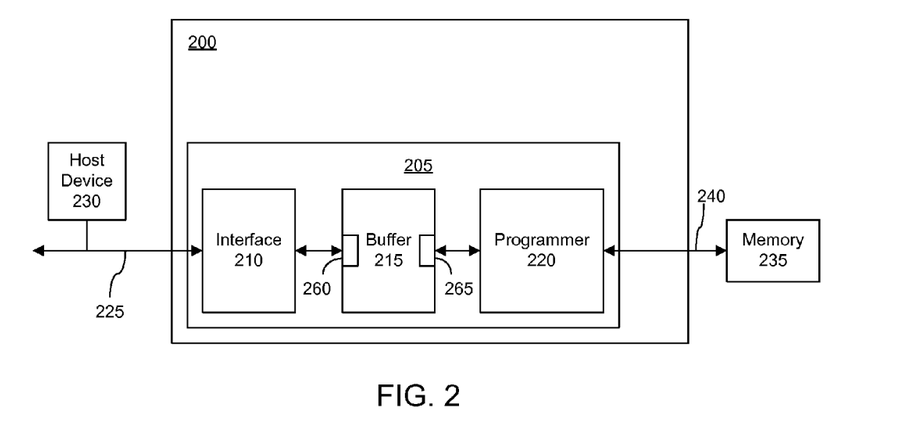
FIG. 2 is a block diagram illustrating a system for programming a memory in accordance with another embodiment disclosed within this specification.

FIG. 2 is a block diagram illustrating a system 205 for programming a memory in accordance with another embodiment disclosed within this specification. System 205 is implemented within an IC 200. IC 200 can be any of a variety of different ICs including, for example, a programmable IC having an architecture as illustrated with reference to FIG. 1.

In another example, IC 200 can be implemented as an application specific integrated circuit (ASIC) or an IC that includes some programmable circuitry.

System 205 can include an interface 210, a buffer 215, and a programmer 220. Each of interface 210, buffer 215, and programmer 220 can be implemented in the form of circuit blocks or modules within IC 200. For example, in the case where IC 200 is a programmable IC, system 205 can be formed using the programmable circuitry available within the programmable IC through the loading of a bitstream specifying a circuit design corresponding to system 205. Interface 210 and programmer 220, for example, can utilize one or more of the various I/Os described with reference to FIG. 1 in order to communicate with devices external to IC 200. When implemented as a programmable IC, IC 200 can include an Internal Configuration Access Port (ICAP) (not shown) that is responsible for implementing a configuration bitstream within IC 200. The ICAP, for example, can load a configuration bitstream into configuration memory cells of IC 200 thereby implementing the physical circuitry of a circuit design as specified by the configuration bitstream within IC 200.

In general, interface 210 can be coupled to a communication channel 225, e.g., a first communication channel. In one aspect, communication channel 225 is not JTAG compliant. For example, communication channel 225 can be one that does not include the particular signals present in, or that characterize, a JTAG compliant port or channel. As pictured, one or more other devices, such as host device 230, can be coupled to communication channel 225 in order to communicate with system 205. Interface 210 can be configured to communicate using the particular communication protocol utilized by communication channel 225. Accordingly, interface 210 can format data that is to be sent out from system 205 in accordance with the correct protocol and transmit the formatted data.

Interface 210 also can receive data sent in the form of packets as input from communication channel 225. In one aspect, interface 210 can be configured to determine which packets detected on communication channel 225 are directed to IC 200. Packets determined by interface 210 to be directed to IC 200 can be processed. Packets determined by interface 210 not to be directed to IC 200 can be ignored. Interface 210 further can decode data received over communication channel 225. Decoding can include distinguishing content data of a packet from signaling data of the packet.

In general, content data can be considered the data that is being sent over communication channel 225 from a device such as host device 230 or the "payload" of the packet. Signaling data, also referred to as "header information," of a packet can include the formatting and/or administrative information that can "wrap" or encapsulate the payload of the packet and that can be used to direct or route the packet over communication channel 225 to a particular device such as IC 200 and/or another system implemented within IC 200. Signaling data can be considered any portion of a packet that is not the payload. For example, signaling data can include addressing data that allows devices on communication channel 225 to determine whether the packet is intended for that device, e.g., according to whether the addressing information matches an address of the device. Accordingly, decoding can include removing, or stripping, the signaling data from a packet or extracting the content data from a packet. In general, interface 210 can be configured to store content data, e.g., payload(s), from a packet within buffer 215.

Buffer 215 can be coupled to interface 210. Interface 210, having extracted content data or payload from a packet received over communication channel 225, can store the payload in buffer 215. In one aspect, buffer 215 can be implemented as a multi-port memory buffer having at least one input port 260 and at least one output port 265. For example, buffer 215 can be implemented as a first-in-first-out memory. Input port 260 can be coupled to an output of interface 210 while output port 265 is coupled to an input of programmer 220. In addition, input port 260 can be clocked independently of output port 265. Accordingly, in cases where interface 210 operates at a frequency that is different from programmer 220, input port 260 of buffer 215 can be clocked using a first clock signal having a first frequency corresponding to, or the same as, the operational frequency of interface 210. Output port 265 of buffer 215 can be clocked using a second clock signal having a second frequency that is different from the first frequency. The second frequency can correspond to, or be the same as, the operational frequency of programmer 220 and memory 235. For example, the first frequency can be approximately 250 MHz, while the second frequency can be approximately 20 MHz.

In general, buffer 215 can function as a temporary storage location for payloads received over communication channel 225 that are to be used to program memory 235 by programmer 220. Programmer 220, which is coupled to buffer 215, can be configured to read data from buffer 215, interpret the data, and program memory 235 as instructed. Programmer 220 can be coupled to memory 235 by a communication channel 240, e.g., a second communication channel. In one aspect, communication channel 240 can be different than communication channel 225. For example, communication channel 240 can be the native interface of memory 235. Communication channel 240, for example, can support direct communication between programmer 220 and memory 235, e.g., where no other devices share or are present on communication channel 240. Communication channel 240, for example, can operate at or about the second frequency.

In one aspect, programmer 220 can be configured to implement a state machine that is operational to write data to memory 235. As shown, memory 235 can be implemented as a memory that is external to IC 200. For example, memory 235 can be a PROM. In another example, memory 235 can be a byte peripheral interface (BPI) type of PROM or flash memory. It should be appreciated, however, that memory 235 can be implemented as any of a variety of other PROM types including, but not limited to, a serial peripheral interface (SPI) PROM, a NAND PROM, or a NOR PROM.

In an embodiment, system 205, can be configured as a program only type of system in that programmer 220 is not configured to read data from memory 235. Such an implementation can be implemented with relatively less complexity than an embodiment in which programmer 220 is configured to perform read operations from memory 235. In another embodiment, however, system 205 can be configured to perform programming operations (e.g., write operations) and read operations for memory 235. Accordingly, programmer 220, in addition to performing programming operations, can read data from memory 235. It should be appreciated that in an embodiment in which programmer 220 is configured to read data from memory 235, programmer 220 can store data read from memory 235 into buffer 215. Buffer 215 can support bidirectional data flows through system 205. Interface 210 then can read data from buffer 215, format the data for sending or transmission via communication channel 225, and send the data.

As noted, system 205 facilitates "in-system" programming of memory 235. System 205 can receive packetized data via communication channel 225. Exemplary implementations of communication channel 225 can include, but are not limited to, a Peripheral Component Interconnect Express (PCI-E) type of bus, an Ethernet type of communication channel, or the like. The packetized data can include programming instructions that can specify data to be stored within memory 235. System 205 can execute the received instructions to program the data into memory 235.

Responsive to a condition in which programming of memory 235 is determined necessary, system 205 can program memory 235. For example, system 205 can receive a programming instruction from host device 230 via communication channel 225. The data that is used to program memory 235 can be received over communication channel 225, e.g., an in-band signaling channel, as opposed to through another communication channel such as a side-band channel that is independent of, and separate from, communication channel 225. One example of a side-band channel can include a JTAG port of IC 200. Once programmed, memory 235 can be accessed by a device other than IC 200, e.g., where IC 200 is dedicated for programming memory 235. In another example to be described in further detail within this specification, circuitry within IC 200 other than system 205 can access memory 235.

When IC 200 is implemented as a programmable IC, IC 200 can be configured to implement user-specified circuitry, e.g., a system, other than system 205 when programming of memory 235 is not required. The user-specified circuitry can implement functions unrelated to programming memory 235. When user-specified circuitry other than system 205 is implemented within IC 200, memory 235 is not being programmed. It should be appreciated, however, that IC 200 still can access, e.g., read, memory 235 and that such read operations are independent of, or separate from, programming memory 235.

Thus, in one or more embodiments, IC 200 can implement user-specified circuitry other than system 205 and receive packets over communication channel 225 that are unrelated to programming memory 235. IC 200 can perform functions unrelated to programming memory 235, inclusive of reading memory 235. For example, IC 200 can perform a processing function requested by a requesting device via communication channel 225 and utilize data read from memory 235 in performing the requested function.

In illustration, consider the case in which IC 200 is initially configured with user-specified circuitry that performs a function other than programming memory 235. Responsive to a request for configuration received within IC 200, e.g., a request from host device 230, IC 200 can load a configuration bitstream that specifies the circuitry of system 205. The configuration bitstream can be received via communication channel 225, e.g., from host device 230 or another device, or read from memory 235. Once the configuration bitstream is loaded into IC 200, system 205 is implemented therein while deployed in the field. System 205 can replace the user-specified circuitry previously implemented within IC 200. Once system 205 is implemented within IC 200, system 205 can receive the programming instruction(s) from host device 230 requesting programming of memory 235 and continue with programming memory 235.

Upon completion of programming memory 235, IC 200 can be configured again to implement different circuitry. IC 200, for example, can be configured to implement the prior implemented user-specified circuitry that was replaced by system 205. In another example, the data that is programmed into memory 235 by system 205 can be an entirely new configuration bitstream or a partial reconfiguration bitstream that can be used to implement different user-specified circuitry within IC 200 after programming is complete. It should be appreciated that the ICAP responsible for implementing a configuration bitstream within IC 200 is not shown for ease of illustration, but would be used in configuring IC 200 to implement system 205 or any user-specified circuitry implemented using the programmable circuitry as described herein. In the above example, interface 210 can be configured to recognize a configuration request and invoke the functionality of the ICAP included within the IC as may be required for configuration.

Figure 3:
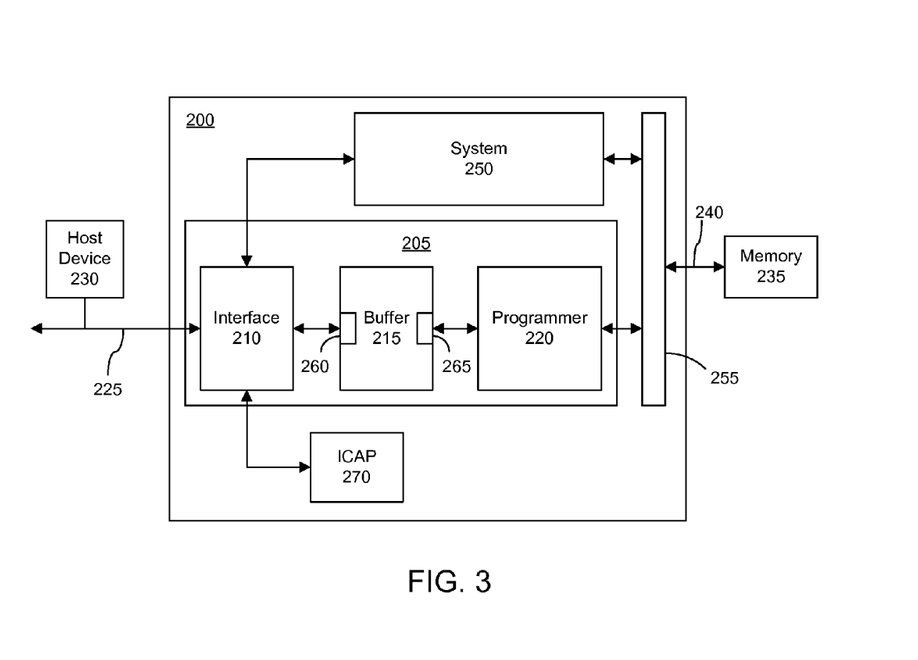
FIG. 3 is a block diagram illustrating the IC of FIG. 2 in accordance with another embodiment disclosed within this specification.

FIG. 3 is a block diagram illustrating IC 200 in accordance with another embodiment disclosed within this specification. As shown, IC 200 includes additional elements not illustrated in FIG. 2. For example, IC 200 includes a system 250, a memory interface 255, and an ICAP 270. FIG. 3 illustrates an embodiment in which system 205 is implemented concurrently with other user-specified circuitry, e.g., system 250. System 250 can represent a user-specified circuit design that performs a function independent of programming memory 235. System 250 can read data from memory 235, but performs no programming of memory 235.

Memory interface 255 can be coupled to memory 235 via communication channel 240. Memory interface 255 can be configured to communicatively link memory 235 with either system 250 or programmer 220. In one aspect, for example, while system 250 and system 205 can co-exist within IC 200, only system 205 or system 250 can be considered the active system at one time. Memory interface 255 can communicatively link the active system to memory 235. Accordingly, when system 250 is active, system 250 can read from memory 235 and system 205 cannot write (or program) memory 235 or read memory 235 in the one or more embodiments in which programmer 220 is configured for read access of memory 235. When system 205 is the active system, system 205 can program memory 235 (and optionally read memory 235) and system 250 cannot read from memory 235.

As noted, ICAP 270 is a hard-wired block within IC 200 that is operable to receive a configuration bitstream and load the configuration bitstream into configuration memory cells (not shown) of IC 200 to implement physical circuitry of the circuit design as specified by the configuration bitstream within IC 200. The configuration bitstream loaded into configuration memory cells by ICAP 270 can be received via communication channel 225 by way of interface 210. In another example, the configuration bitstream can be read from memory 235 by programmer 220 and provided to ICAP 270 via buffer 215 and interface 210.

In accordance with the one or more embodiments illustrated in FIG. 3, decoding also can include determining an intended recipient of a packet received via communication channel 225. In one or more embodiments, packets received by interface 210 can be intended for one or more different recipients within IC 200. Interface 210, for example, can be configured to interpret the signaling information within a packet to determine the intended recipient of the packet. Interface 210 can determine the address specified in the packet and determine the recipient that is associated with the specified address. In one aspect, interface 210 can extract the payload of a packet and provide the packet to the intended recipient, whether the payload is stored within buffer 215 or is intended to be provided to system 250.

In another aspect, in cases where the intended recipient is a device or system other than buffer 215, e.g., is system 250, interface 210 can forward the entire packet to the intended recipient. For example, IC 200 can include one or more additional circuits and/or systems such as system 250 to which packets received over communication channel 225 can be directed. Interface 210 can be configured to determine the proper recipient from the signaling information of the packet and provide the content data of the packet or the packet itself to the intended, e.g., proper, recipient.

As noted, in one or more embodiments, system 205 can be dedicated for purposes of programming memory 235. Communication channel 225, however, can be utilized for multiple purposes. Communication channel 225 can carry data needed by IC 200 for normal operations and/or functions that are unrelated to programming memory 235 and also carry information needed by system 205 to program memory 235 when IC 200 is deployed in the field. This dual use of communication channel 225 facilitates in-system programming of memory 235 that does not utilize side-band communications.

Whereas FIG. 2 illustrates one or more embodiments in which system 205 and a system such as system 250 are not implemented concurrently within IC 200, FIG. 3 illustrates a concurrent implementation. In one or more embodiments, IC 200 can undergo partial reconfiguration in which a portion, e.g., a part, of a configuration bitstream is loaded into IC 200 to implement different physical circuitry in place of system 250. For example, system 205 can be utilized to download a configuration bitstream or a partial reconfiguration bitstream that can be stored within memory 235 and subsequently used to implement a system other than system 250, e.g., different user-specified circuitry, in place of system 250 within IC 200.

In another embodiment, memory interface 255 can include circuitry for arbitrating access to memory 235 by system 205 and by system 250. In such an embodiment, memory interface 255, for example, can determine which of systems 205 and 250 is the active system and communicatively link the active system with memory 235 at any given time.

Figure 4:
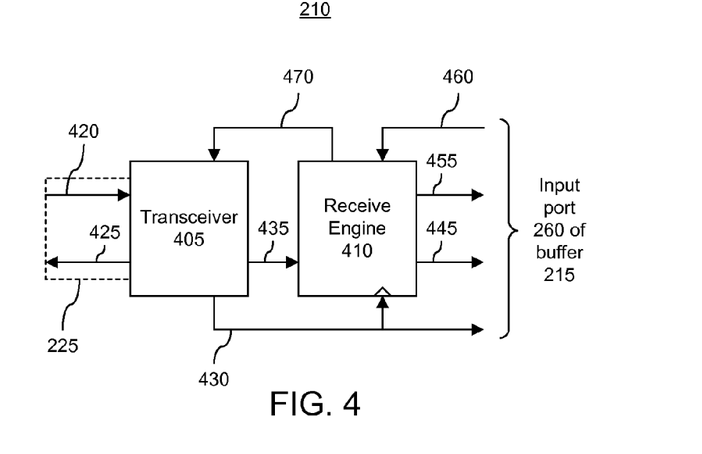
FIG. 4 is a block diagram illustrating the interface of FIG. 2 or 3 in accordance with another embodiment disclosed within this specification.

FIG. 4 is a block diagram illustrating interface 210 of FIG. 2 or 3 in accordance with another embodiment disclosed within this specification. FIG. 4 illustrates an exemplary implementation of interface 210. Accordingly, FIG. 4 is provided for purposes of illustration and is not intended to limit the one or more embodiments disclosed within this specification. FIG. 4, for example, illustrates an implementation that can be utilized when communication channel 225 is implemented in the form of a PCI-E bus or an Ethernet communication channel. Like numbers will be used to refer to the same items throughout this specification.

Interface 210 can include a transceiver 405 and a receive engine 410. Transceiver 405 can provide the inputs and outputs necessary to physically couple to communication channel 225. As shown, communication channel 225 can include an input channel 420 and an output channel 425. Transceiver 405, for example, can be implemented using I/Os described with reference to FIG. 1 such as one or more of the MGTs or the like. Accordingly, transceiver 405 can receive packets over input channel 420 and output packets over output channel 425.

In one aspect, transceiver 405 can be configured to determine whether packets detected on communication channel 225 are directed to IC 200, e.g., according to signaling information for each respective packet. In another aspect, transceiver 405 can output a clock signal 430 that is provided to receive engine 410. Clock signal 430 is further provided to input port 260 of buffer 215. As shown, transceiver 405 can output packets received via input channel 420 to receive engine 410 through signal 435.

Receive engine 410 can receive packets over signal 435 from transceiver 405. Receive engine 410 can be configured to decode the incoming packets. For example, receive engine 410 can be configured to extract the payload from each incoming packet, also referred to as "packetized data." In some cases, extracting a payload from a packet can be referred to as "de-packetizing."

Receive engine 410 further can be configured to write the payloads extracted from received packets to buffer 215. Receive engine 410 can write the payloads to buffer 215 via signal 445. In general, when transceiver 405 provides a packet to receive engine 410, receive engine 410 can assert a signal 455 to buffer 215. Signal 455 can be an enable signal for buffer 215 that, once asserted, allows receive engine 410 to write data to buffer 215. As such, assertion of signal 455 by receive engine 410 indicates to buffer 215 that receive engine 410 is writing data, e.g., a payload, to input port 260 of buffer 215 via signal 445.

As shown, buffer 215 can provide a signal 460 back to receive engine 410. Signal 460 can be a pause signal indicating that buffer 215 is busy processing a payload or does not have sufficient free or unused memory for receiving a further payload. Responsive to assertion of signal 460, receive engine 410 can assert signal 470, e.g., another pause signal, to transceiver 405. Receive engine 410 also can stop writing data to buffer 215. Transceiver 405, responsive to assertion of signal 470, can signal the host device that is sending data on communication channel 225 for programming memory 235 to pause. When buffer 215 indicates that further data can be received, signal 460 can be de-asserted, thereby discontinuing the pause condition observed within receive engine 410 and transceiver 405. Transceiver 405 can signal the host to continue sending packets.

Figure 5:
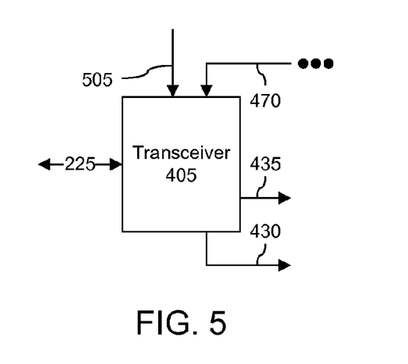
FIG. 5 is a block diagram illustrating the transceiver of FIG. 4 in accordance with another embodiment disclosed within this specification.

FIG. 5 is a block diagram illustrating transceiver 405 of FIG. 4 in accordance with another embodiment disclosed within this specification. As pictured, transceiver 405 receives a signal 505. Signal 505 can be a separate signal path that can be used by one or more other systems or devices, e.g., system 250 of FIG. 3, to send data out on communication channel 225. For example, signal 505 can be provided by a transmit engine located elsewhere within IC 200 that can provide data or packets for sending on communication channel 225. The structure illustrated in FIG. 5 can be used in instances where system 205 uses communication channel 225 concurrently with one or more other systems within IC 200 such as system 250 as illustrated in FIG. 3.

Figure 6:
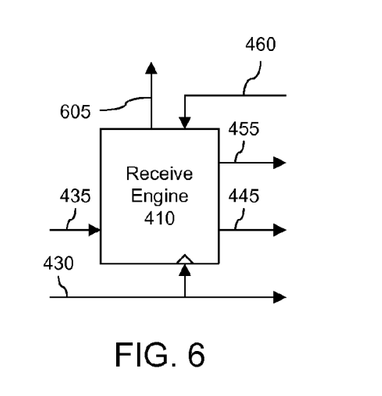
FIG. 6 is a block diagram illustrating the receive engine of FIG. 4 in accordance with another embodiment disclosed within this specification.

FIG. 6 is a block diagram illustrating receive engine 410 of FIG. 4 in accordance with another embodiment disclosed within this specification. As pictured, receive engine 410 can output a signal 605 that can be provided to one or more other devices and/or systems, e.g., system 250 of FIG. 3, within IC 200. In one aspect, receive engine 410 can be configured to output packets that are not intended for use in programming memory 235 via signal 605. In another aspect, receive engine 410 can be configured to output only payloads of packets that are not intended for use in programming memory 235.

Figure 7:
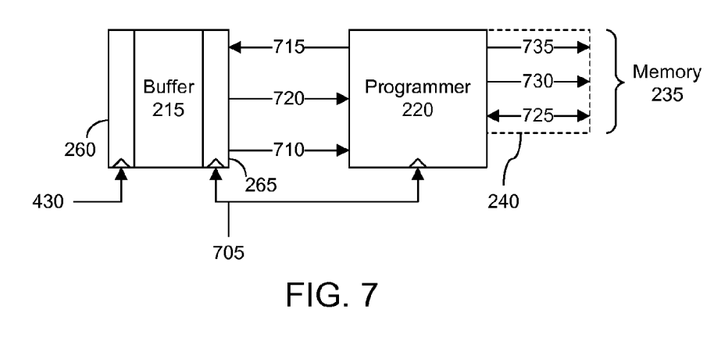
FIG. 7 is a block diagram illustrating a portion of the system of FIG. 2 in accordance with another embodiment disclosed within this specification.

FIG. 7 is a block diagram illustrating a portion of system 205 of FIG. 2 in accordance with another embodiment disclosed within this specification. More particularly, FIG. 7 illustrates the interaction between buffer 215 and programmer 220 of system 205 in greater detail. As shown, buffer 215 receives clock signal 430, which clocks input port 260 of buffer 215. A second and different clock signal 705 is received which clocks output port 265 of buffer 215. Clock signal 705 further is provided to programmer 220 for clocking operations of programmer 220.

Buffer 215 can be configured to provide data stored therein to programmer 220 via signal 710. In one aspect, signal 715 can be a read enable signal that, when asserted by programmer 220, allows programmer 220 to read data from buffer 215 over signal 710. Signal 720 can be one or more status signals provided from buffer 215 to programmer 220. For example, signal 720 can indicate when buffer 215 is full. In another example, signal 720 can indicate when buffer 215 is empty. In another example, signal 720 can represent two or more individual signals where a first one of the signals indicates when buffer 215 is full and a second one of the signals indicates when buffer 215 is empty. It should be appreciated, however, that signal 720 can be configured to indicate whether buffer 215 is more than a selected percentage full, e.g., more than 25%, 50%, or 75% full, or the like.

Programmer 220 can be configured to communicate with memory 235 using the commands natively understood by memory 235 for implementing programming operations. For example, in the case of a PROM, an entire block must be deleted prior to programming that block. A "block" can refer to a plurality of memory addresses or locations within memory 235. Programmer 220 can implement such operations, i.e., selecting a block for erasure, unlocking the block, erasing the block, and/or writing new data to the block. In one or more embodiments, programmer 220 can be configured as a programming only device that is capable of only programming memory 235, but not reading blocks from within memory 235.

In one aspect, communication channel 240 can include one or more signals such as signals 725, 730, and 735. In general, signal 725 can represent one or more data signals over which programmer 220 can send data to memory 235. In some cases, signal 725 can be bi-directional thereby allowing data to be read from memory 235 and/or allowing status information to be provided from memory 235 to programmer 220. In one or more embodiments in which memory 235 includes an address bus, signal 730 can represent one or more signals specifying address information, e.g., a starting and/or ending address of a block to which a given operation, e.g., unlocking, erasing, and/or writing, is directed. It should be appreciated that signal 730 can be optional or removed in cases where memory 235 does not include an address bus. Signal 735 can represent one or more control signals over which instructions such as unlock, erase, and/or write, can be propagated to memory 235. While illustrated as a unidirectional signal, in another aspect, signal 735 can represent one or more bi-directional signals allowing memory 235 to provide status information back to programmer 220.

In another aspect, programmer 220 can be configured to operate in a high performance mode in which multiple bytes of data can be written to memory 235 during a single transaction. For example, in an embodiment, 1024 bytes of data can be written to memory 235, which can include an internal buffer allowing received data to be temporarily stored until such time that memory 235 is able to store the bytes in the correct internal memory location.

In general, each payload intended for use in programming memory 235 can specify programming instructions that are understandable by programmer 220 and that can include or specify data to be written to memory 235. Programmer 220 can interpret the payload to determine or identify any programming instructions included therein or data to be written to memory 235. In this regard, programmer 220 can translate the programming instructions received in the payload from a host device into the specific signaling needed to program, e.g., store, any data included in the payload into memory 235.

Figure 8:
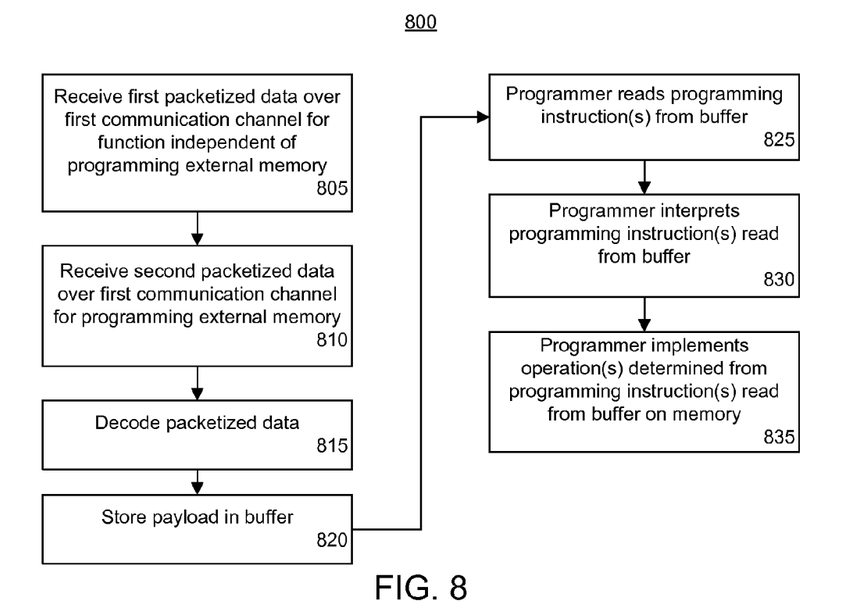
FIG. 8 is a flow chart illustrating a method of programming a memory in accordance with another embodiment disclosed within this specification.

FIG. 8 is a flow chart illustrating a method 800 of programming a memory in accordance with another embodiment disclosed within this specification. Method 800 can be implemented by a system such as system 205 within an IC. For example, the IC including system 205 can be deployed into the field. The IC can be coupled to an external memory such as a PROM.

In block 805, the IC can receive first packetized data for use in performing a function other than programming a memory coupled to the IC. The packetized data can be received or detected over a first communication channel that is an in-band signaling channel. The first packetized data, for example, can represent data exchanged between a host device and one or more other devices also on the first communication channel. The interface can be configured to disregard packetized data on the first communication channel specifying an address that is not correlated with, or assigned to, the IC. Such packetized data can be considered unrelated to programming the memory coupled to the IC.

In block 810, the IC can receive second packetized data specifying programming instructions for programming the memory. The second packetized data also can be received over the first communication channel. The interface, for example, can determine that the second packetized data has an address corresponding to the IC.

In block 815, the interface can decode the packetized data. For example, the interface can decode the packetized data by extracting the payload, or payloads, from the packetized data. In block 820, the interface can store the payload in the buffer. In block 825, the programmer can read the data (e.g., one or more stored payloads or portions thereof) from the buffer. It should be appreciated that the data that is packetized, e.g., encapsulated with signaling information, can include programming instructions issued by the host device that are understandable by the programmer and that the programmer can transform the programming instructions into the actual signals necessary to program the memory coupled thereto. In this regard, the payload that is provided to the programmer can include programming instructions understandable by the programmer that also can specify the data that is to be written to the memory when the programmer executes the programming instructions.

In block 830, the programmer can interpret the data, e.g., programming instructions, read from the buffer. For example, the programmer can determine whether the programming instructions that is read specifies content to be written, a starting and/or ending address of a target memory block of the PROM for an operation, a read operation, an unlock operation, an write operation, another operation, and/or some combination thereof.

In block 835, the programmer can implement the particular operations determined from interpretation of the programming instruction read from the buffer. For example, the programmer can implement the signaling necessary over the second communication channel with the memory to unlock any target blocks of memory specified, erase any target blocks of memory specified, and/or to write to any target blocks of memory specified. Method 800 can repeat as necessary until no further data remains within the buffer to be processed and/or otherwise interpreted by the programmer.

Figure 9:
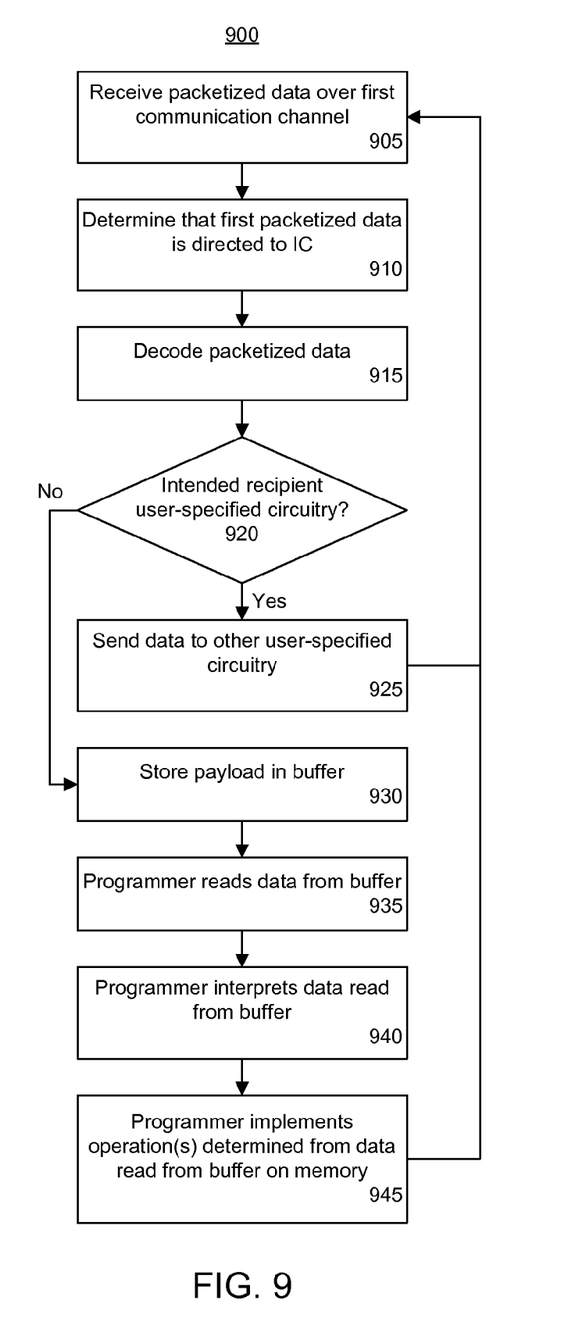
FIG. 9 is a flow chart illustrating a method of programming a memory in accordance with another embodiment disclosed within this specification.

FIG. 9 is a flow chart illustrating a method 900 of programming a memory in accordance with another embodiment disclosed within this specification. Method 900 can be implemented by a system such as system 205 within an IC in which system 205 co-exists with another user-specified circuit design such as system 250 (user-specified circuitry). Method 900 can begin in a state where an electronic system including the IC in which system 205 and the user-specified circuitry are implemented is coupled to a memory external to the IC, e.g., a PROM, and is deployed in the field.

In block 905, the IC can receive packetized data over the first communication channel from a host device. In step 910, the interface can determine that the packetized data is directed to, and intended for, the IC. In block 915, the interface can decode the packetized data. In decoding the packetized data, the interface can determine whether the packetized data is directed to the system for programming the memory or the user-specified circuitry.

Packetized data directed to the system for programming the memory, for example, will specify programming instructions for programming the memory. Packetized data directed to the user-specified circuitry is unrelated to programming the memory. As discussed, the interface can determine the particular recipient to which the packetized data is directed from an address in the signaling information in each respective packet. In this regard, for example, the interface can distinguish between packetized data that is intended to be provided to the user-specified circuitry or to the system for programming the memory. In block 915, the interface further can extract the payload(s) from the received packetized data.

In block 920, the interface can determine whether the recipient is the user-specified circuitry within the IC as opposed to system for programming the memory based upon the decoding performed in block 915. Responsive to determining that the packetized data is intended for the user-specified circuitry, method 900 can continue to block 925. In block 925, the interface can provide the packetized data to the user-specified circuitry. As discussed, either the payloads or the entire packets can be provided to the user-specified circuitry depending upon the particular implementation of the interface and/or the user-specified circuitry. The user-specified circuitry can perform any non-programming related function indicated by the received packet(s). After block 925, method 900 can loop back to block 905 to continue processing further packetized data.

Continuing with block 930, in the case where the intended recipient is the system for programming the memory, the interface can store the payload extracted from the packetized data in the buffer. In block 935, the programmer can read the payload(s), e.g., programming instruction(s), from the buffer. In step 940, the programmer can interpret the programming instruction(s) read from the buffer. In block 945, the programmer can execute the operation(s) specified by the programming instruction(s) read from the buffer to program the memory. After block 945, method 900 can loop back to block 905 to continue processing.

The one or more embodiments disclosed within this specification illustrate various techniques and structures for "in-system" programming of a memory. A memory, such as a PROM, that is coupled to an IC can be programmed using the same communication channel over which the IC communicates with one or more other devices during normal operations unassociated with programming the memory. The in-system programming described does not require the use of a separate communication channel, e.g., side-band signaling. As illustrated, programming of the memory can be effectuated using the IC when the IC functions as an endpoint on a PCI-E type of bus or is coupled to another communication channel such as Ethernet.

For purposes of explanation, specific nomenclature is set forth to provide a thorough understanding of the various inventive concepts disclosed herein. The terminology used herein, however, is for the purpose of describing particular embodiments only and is not intended to be limiting. For example, reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to, and encompasses, any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Within this specification, the same reference characters are used to refer to terminals, signal lines, wires, and their corresponding signals. Accordingly, the terms "signal," "wire," "connection," "terminal," and "pin" may be used interchangeably, from time-to-time, within this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more embodiments further can be embedded in a computer program product that includes all the features enabling the implementation of the methods described herein. The computer program product can include a data storage medium, e.g., a non-transitory computer-usable or computer-readable medium, storing program code such as a circuit design that, when loaded within a system such as a programmable IC implements the circuitry described herein. Examples of data storage media can include, but are not limited to, optical media, magnetic media, magneto-optical media, computer memory such as random access memory, a bulk storage device, e.g., hard disk, or the like.

It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One or more embodiments disclosed within this specification can be embodied in other forms without departing from the spirit or essential attributes thereof. Accordingly, reference should be made to the following claims, rather than to the foregoing specification, as indicating the scope of the one or more embodiments.

What is claimed is:

1. An integrated circuit, comprising:
an interface configured to receive packetized data specifying a programming instruction for a memory external to the integrated circuit over a first communication channel;
wherein the first communication channel is an in-band signaling channel also used by the integrated circuit when performing a function independent of programming the memory and the memory is a programmable read-only memory external to the integrated circuit;
a buffer comprising a first port coupled to the interface and a second port;
wherein the buffer is configured to store the programming instruction extracted from the packetized data;
a programmer coupled to the second port;
wherein the programmer reads the programming instruction from the buffer through the second port;
wherein the programmer is configured to program the memory over a second communication channel different from the first communication channel responsive to interpretation of the programming instruction from the buffer;
user-specified circuitry implemented within the integrated circuit and coupled to the interface;
wherein the user-specified circuitry is configured to communicate over the first communication channel for performing a function independent of programming the memory; and
a memory interface coupled to the programmer and the user-specified circuitry;
wherein the memory interface communicatively links one of the programmer or the user-specified circuitry with the memory at a time.

2. The integrated circuit of claim 1, wherein the interface and the first port of the buffer are clocked with a first clock signal; and
wherein the second port of the buffer and the programmer are clocked with a second clock signal having a frequency that is different from the first clock signal.

3. The integrated circuit of claim 1, wherein the first communication channel is not Joint Test Action Group (JTAG) port compliant.

4. The integrated circuit of claim 1, wherein the first communication channel is a Peripheral Component Interconnect Express (PCI-E) bus.

5. The integrated circuit of claim 1, wherein the first communication channel is an Ethernet communication channel.

6. The integrated circuit of claim 1, wherein the interface comprises:
a transceiver coupled to the first communication channel; and
a receive engine coupled to the transceiver and the first port of the buffer;
wherein the receive engine is configured to extract the programming instruction from a packet received by the transceiver over the first communication channel and write the programming instruction into the buffer.

7. The integrated circuit of claim 6, wherein the receive engine is further configured to distinguish between a packet received over the first communication channel for the function independent of programming the memory and a packet received over the first communication channel for programming the memory.

8. The integrated circuit of claim 7, wherein, responsive to determining that the packet is for the user-specified circuitry, the receive engine sends the payload of the packet to the user-specified circuitry.

9. The integrated circuit of claim 7, wherein, responsive to determining that the packet is for the user-specified circuitry, the receive engine sends the entire packet to the user-specified circuitry.

10. The integrated circuit of claim 6, wherein the receive engine is configured to provide at least a payload of a packet determined to be for the function independent of programming the memory to user-specified circuitry configured to perform the function unrelated to programming the memory and implemented within the integrated circuit; and
wherein the user-specified circuitry is configured to communicate over the first communication channel for performing the function independent of programming the memory.

11. The integrated circuit of claim 1, wherein:
the interface comprises a transceiver configured to receive data from the user-specified circuitry; and
the user-specified circuitry uses the first communication channel concurrently with the interface, the buffer, and the programmer.

12. A system, comprising:
an integrated circuit configured to receive, within an interface implemented therein, a programming instruction for programming a programmable read only memory external to the integrated circuit over a first communication channel and program the memory using a programmer implemented therein, responsive to the programming instruction, over a second communication channel that is different from the first communication channel;
wherein the first communication channel is an in-band signaling channel used by the integrated circuit when configured for performing a function independent of programming the memory;
a buffer within the integrated circuit comprising a first port and a second port;
wherein the interface stores the programming instruction within the buffer using the first port;
wherein the programmer reads the instruction from the buffer through the second port;
user-specified circuitry implemented within the integrated circuit and coupled to the interface;
wherein the user-specified circuitry is configured to communicate over the first communication channel for performing a function independent of programming the memory; and
a memory interface coupled to the programmer and the user-specified circuitry;
wherein the memory interface communicatively links one of the programmer or the user-specified circuitry with the programmable read only memory at a time.

13. The system of claim 12, wherein the first communication channel is not Joint Test Action Group (JTAG) port compliant.

14. The system of claim 12, wherein the interface is configured to distinguish between a packet received over the first communication channel for use by the user-specified circuitry and a packet received over the first communication channel for programming the programmable read only memory.

15. The system of claim 12, wherein:
the interface comprises a transceiver configured to receive data from the user-specified circuitry; and
the user-specified circuitry uses the first communication channel concurrently with the interface, the buffer, and the programmer.

16. A method, comprising:
receiving, by an integrated circuit and over a first communication channel, a first packet associated with a first function of the integrated circuit that is independent of programming a programmable read-only memory external to the integrated circuit;
wherein the integrated circuit comprises an interface configured to receive the first packet and provide the first packet to user-specified circuitry implemented within the integrated circuit;
receiving a second packet associated with a second function of the integrated circuit within the interface;
wherein the second function comprises programming the programmable read-only memory coupled to the integrated circuit;
the interface extracting a programming instruction from the second packet and storing the programming instruction within a buffer using a first port of the buffer;
programming the programmable read-only memory, using a programmer within the integrated circuit responsive to reading the programming instruction from a second port of the buffer, wherein the programmer programs the read-only memory over a second communication channel that is different from the first communication channel; and
arbitrating, using a memory interface within the integrated circuit that is coupled to the programmer, the user-specified circuitry, and the programmable read only memory, between the programmer and the user-specified circuitry so that either the programmer or the user-specified circuitry is communicatively linked with the programmable read-only memory at a time.

17. The method of claim 16, wherein the programming of the programmable read-only memory is implemented while the integrated circuit and memory are deployed in field.

18. The method of claim 16, further comprising:
distributing at least a portion of the first packet to user-specified circuitry implemented within the integrated circuit that is configured to implement the first function at least in part.

19. The method of claim 16, wherein the first communication channel is not Joint Test Action Group (JTAG) port compliant.

* * * * *